United States Patent [19]

Fierthaler

[11] Patent Number: 5,081,770
[45] Date of Patent: Jan. 21, 1992

[54] TOMATO KNIFE

[76] Inventor: Frederick Fierthaler, Perch Pond Rd., R.D. #1, Box 133, Nineveh, N.Y. 13813

[21] Appl. No.: 384,362

[22] Filed: Jul. 25, 1989

[51] Int. Cl.$^5$ .............................................. B26B 9/02
[52] U.S. Cl. .................................... 30/355; 30/351; 30/357
[58] Field of Search ................. 30/346, 351, 353, 355, 30/356, 357

[56] References Cited

U.S. PATENT DOCUMENTS 3,363,315  1/1968  Anderson .................... 30/351 X
4,787,146  11/1988  Gaskins ...................... 30/351 X

FOREIGN PATENT DOCUMENTS 270574  5/1927  United Kingdom ................ 30/356

*Primary Examiner*—Timothy V. Eley
*Assistant Examiner*—Willmon Fridie, Jr.
*Attorney, Agent, or Firm*—Salzman & Levy

[57] ABSTRACT

The invention features a knife for use with fruits and vegetables. The blade of the knife has a single serration along a curved cutting edge, which allows the blade to pierce and cut through a tough rind or skin of a fruit, while preventing the tearing of the soft, inner pulp.

20 Claims, 1 Drawing Sheet

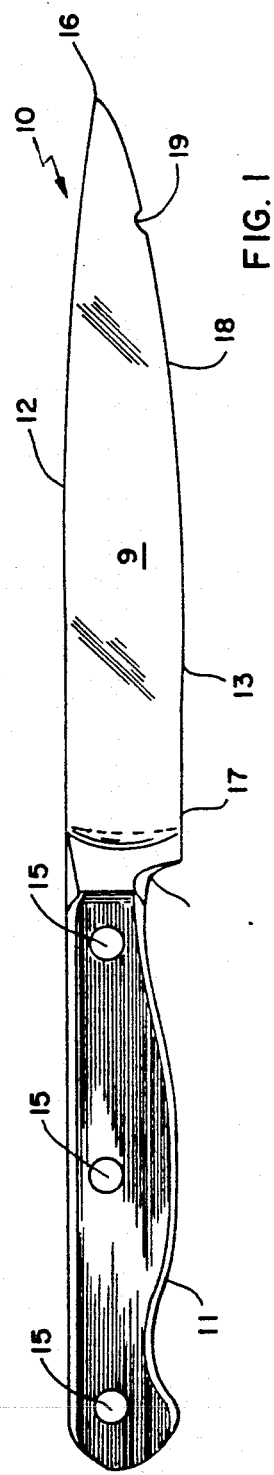
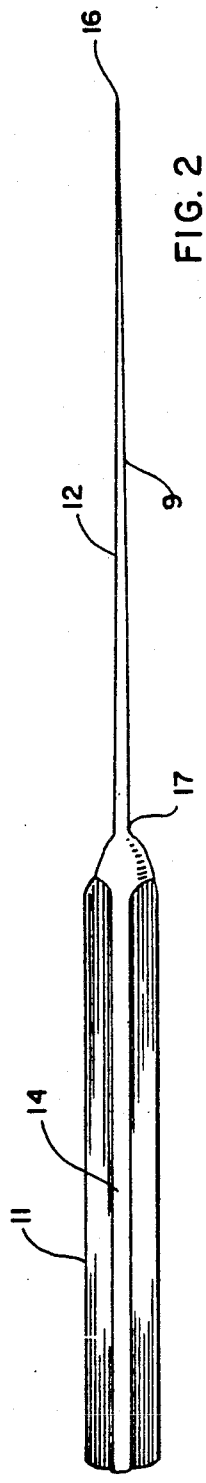
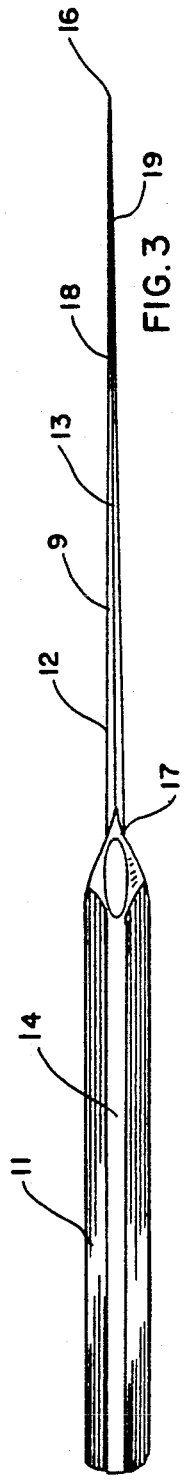

TOMATO KNIFE

FIELD OF THE INVENTION

This invention pertains to cutlery and more particularly to a knife for piercing and cutting a tough outer skin or rind of a fruit or vegetable, without tearing or otherwise damaging the soft inner pulp.

BACKGROUND OF THE INVENTION

Many fruits and vegetables have tough outer skins or rinds that are not easily pierced without damaging the soft inner pulp.

In order to cut a slice from a tomato, for example, knives or utensils having serrated edges have been developed. Such a knife and utensil are respectively illustrated in U.S. Pat. No. Des. 269,244, issued June 7, 1983; and No. 2,938,267, issued May 31, 1960.

While these knives and utensils are generally useful for their intended purpose, it has been discovered that they often cut too deeply into the soft pulp of the fruit after piercing the rind.

The serrated blades, in other words, are too much of a good thing, in that there is an excess of tearing power provided by the serrations that often damages the soft pulp of the fruit.

The present invention addresses the discovery that only a single serration disposed along a curved edged blade is sufficient to pierce and cut through the skin of a tomato without tearing the inner pulp.

DISCUSSION OF RELATED ART

In U.S. Pat. No. 991,953; issued May 9, 1911, a straight edged table knife having a tooth disposed in a front portion thereof, and defined by two adjoining side notches, is shown.

This knife was designed for cutting meats and scaling fish, wherein the tooth and the side notches act as a chisel.

This knife provides an enhanced cutting and tearing surface that can easily separate the flesh of the meat from its bones.

While this knife is useful for its intended purpose, it would provide too much tearing force to a delicate fruit, such as a tomato.

By contrast, the present invention does not feature a tooth, but a single arcuate notch. In addition, by placing the notch of the invention on a curved cutting surface, a shallow cut into the skin or rind of the fruit is obtained.

SUMMARY OF THE INVENTION

The invention relates to a knife for use with fruit, such as a tomato. The knife can easily break and cut the tough outer skin of the fruit without substantially tearing or otherwise damaging the delicate inner pulp.

The knife blade comprises a curved cutting portion and a straight cutting portion that extends for at least one-half of the blade length.

An arcuate notch is disposed along the curved cutting edge of the blade approximately between one-half inch to one inch from the point of the blade.

The arcuate notch is approximately one-eighth of an inch long and about one-sixteenth of an inch in depth.

The blade itself is approximately between four and one-half to five inches in overall length.

The back of the blade features a dull surface that tapers from one-sixteenth of an inch adjacent the tang to about one-sixty-fourth of an inch at the point of the blade.

It is an object of this invention to provide an improved knife for use with fruits and vegetables.

It is another object of the invention to provide a fruit knife for piercing and cutting through the tough outer rind or skin of a fruit without tearing or damaging the soft, inner pulp.

BRIEF DESCRIPTION OF THE DRAWINGS

A complete understanding of the present invention may be obtained by reference to the accompanying drawings, when taken in conjunction with the detailed description thereof and in which:

FIG. 1 is a side view of the knife of this invention;

FIG. 2 is a top view of the knife shown in FIG. 1; and

FIG. 3 is a bottom view of the knife illustrated in FIG. 1.

DESCRIPTION OF THE PREFERRED EMBODIMENT

Generally speaking, the invention features a fruit knife for piercing and cutting through the outer rind of the fruit, while not causing damage to soft, inner pulp.

For purposes of clarity, like elements will bear the same designation throughout the figures.

Now referring to FIG. 1, the knife 10 of this invention is illustrated.

The knife 10 features a cutting blade 9 and a handle 11 for holding and utilizing the blade 9.

The blade 9 has a dull back edge 12 and a sharp cutting edge 13.

A tang 14 is integrally formed with blade 9. Tang 14 is fastened to handle 11 by means of three rivets 15.

The cutting edge 13 and back edge 12 terminate at the forward end in a sharp point 16. The point 16 is intended for use as a coring device on such objects as tomatoes, not shown.

The cutting edge 13 has a straight cutting profile for approximately one-half of its length beginning from the edge 17 of tang 14 and extending forward towards point 16. The remaining portion 18 of cutting edge 13 is curved; the curve becoming more acute as it approaches the sharp point 16.

About ¾ inch from point 16, an arcuate notch 19 is located along cutting edge 13. The notch 19 is approximately ⅛ inch long and about 1/16 inch deep. It is this single serration that provides the unique cutting features of the invention. Disposed along a curved edge 13, the arcuate notch 19 is capable of piercing and cutting into a tough rind of a fruit (not shown) without causing substantial tearing to the soft inner pulp.

The notch 19 being disposed along a curved portion 18 of the cutting edge 13 allows for a very shallow depth of cut into the pulp, thus substantially reducing the tearing action thereto.

The notch 19 being only a single serration also reduces the tearing action in the pulp, while being sufficiently abrasive so as to pierce and cut the rind.

Referring to FIG. 2, the back edge 12 is shown in more detail. Back edge 12 tapers in thickness from the edge 17 of tang 14 to point 16, from about 1/16 inch to about 1/64 inch.

The back edge 12 also tapers downward towards edge 13, as shown in FIG. 3, in order to provide a sharp cutting surface along edge 13.

Blade 9 is preferably made from high-carbon stainless steel, about 4⅞ inches along edge 13. The blade 9 is formed of metal in preferred embodiments such as stainless steel, tempered steel or the like, as is well known in the art; but other suitable materials (e.g., forged alloys, molded plastics) can also be used without departing from the scope of the present invention. The knife 10, including the handle 11, has an overall length of 8¾ inches. The handle 11 can be made from wood or high density plastic.

Having thus described the invention, what is desired to be protected by Letters Patent is presented in the subsequently appended claims.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A knife for particular use with fruit such as a tomato, wherein an outer rind or skin of the fruit is easily broken and cut without substantially tearing the delicate inner pulp thereof, said knife comprising:
   a cutting blade having a straight cutting edge for at least approximately fifty percent of its cutting edge surface and having a convexly curved cutting edge surface thereafter, terminating in a sharp profile with respect to a back edge surface;
   means defining a tang disposed on a distal end of said cutting blade for attachment to a blade handle;
   a blade handle attached to said tang; and
   means defining a single, small arcuate notch disposed along said convexly curved cutting edge of said cutting blade approximately between one-half to one inch from said sharp point for piercing and cutting an outer rind or skin of a fruit without substantially tearing or otherwise damaging its inner pulp.

2. The knife of claim 1, wherein said arcuate notch is approximately three-quarters of an inch from said sharp point.

3. The knife of claim 2, wherein said arcuate notch is approximately one-eighth of an inch in cutting edge length.

4. The knife of claim 1, wherein said arcuate notch is approximately one-eighth of an inch in cutting edge length.

5. The knife of claim 4, wherein said arcuate notch is approximately one-sixteenth of an inch deep.

6. The knife of claim 3, wherein said arcuate notch is approximately one-sixteenth of an inch deep.

7. The knife of claim 2, wherein said arcuate notch is approximately one-sixteenth of an inch deep.

8. The knife of claim 1, wherein said arcuate notch is approximately one-sixteenth of an inch deep.

9. The knife of claim 1, wherein said tang is riveted to said blade handle.

10. The knife of claim 1, wherein said cutting blade length is approximately 4½ to 5 inches.

11. The knife of claim 1, wherein the thickness of said back edge surface of said cutting blade tapers from approximately one-sixteenth of an inch adjacent said tang to approximately one-sixty-fourth of an inch at said sharp point.

12. A knife blade for particular use with fruit, such as a tomato, wherein an outer rind or skin of the fruit is easily broken and cut without substantially tearing the delicate inner pulp thereof, said knife blade comprising:
   an elongated metal member having a tang portion for attachment to a handle at a distal end thereof, and a cutting portion terminating in a sharp point on an opposite distal end, said elongated metal member having its cutting portion defined by a first and second edge that are disposed opposite to each other, said first edge having a substantially dull surface, and said second edge having a sharp cutting surface, approximately at least one-half of which is substantially straight, the remaining portion thereof being convexly curved towards said sharp point, and means defining an arcuate notch disposed upon said second edge adjacent said sharp point for piercing and cutting an outer rind or skin of a fruit without substantially tearing or otherwise damaging its inner pulp.

13. The knife blade of claim 12, wherein said arcuate notch is disposed approximately between one-half to one inch from said sharp point.

14. The knife blade of claim 13, wherein said arcuate notch is disposed approximately three-quarters of an inch from said sharp point.

15. The knife blade of claim 12, wherein said arcuate notch is approximately one-eighth of an inch in cutting edge length.

16. The knife blade of claim 12, wherein said arcuate notch is approximately one-sixteenth of an inch deep.

17. The knife blade of claim 12, wherein said cutting edge surface is approximately between four and one-half to five inches long.

18. The knife blade of claim 12, wherein said first edge tapers in thickness from approximately one-sixteenth of an inch adjacent said tang portion to approximately one-sixty-fourth of an inch at said sharp point.

19. The knife blade of claim 12, wherein said first edge is curved adjacent said sharp point and substantially straight adjacent said tank portion.

20. A cutting blade for a knife, comprising:
   an elongated member having a first and second edge, said first edge bring substantially dull and defining a back portion of said blade, and said second edge being sharp and defining a cutting edge thereof, said first and second edges terminating in a sharp point on one end and a tang portion on an opposite end, said cutting edge of said second edge having at least one-half of its length being substantially straight and a remaining length portion being convexly curved, and means defining an arcuate notch disposed approximately three-quarters of an inch from said sharp point along said curved length portion of said second edge, said arcuate notch being approximately one-eighth of an inch in length along said cutting edge and approximately one-sixteenth of an inch deep.

* * * * *